(12) United States Patent
Juhue et al.

(10) Patent No.: US 7,087,694 B2
(45) Date of Patent: Aug. 8, 2006

(54) FLUORINATED COPOLYMERS FOR HYDROPHOBIC AND OLEOPHOBIC TREATMENT OF BUILDING MATERIALS

(75) Inventors: Didier Juhue, Vernon (FR); Martial Pabon, Courbevoie (FR); André Kowalik, Gouvieux (FR); Jean-Marc Corpart, Sannois (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 233 days.

(21) Appl. No.: 10/416,243

(22) PCT Filed: Nov. 13, 2001

(86) PCT No.: PCT/FR01/03539

§ 371 (c)(1),
(2), (4) Date: Nov. 20, 2003

(87) PCT Pub. No.: WO02/40557

PCT Pub. Date: May 23, 2002

(65) Prior Publication Data

US 2004/0077758 A1    Apr. 22, 2004

(30) Foreign Application Priority Data

Nov. 15, 2000 (FR) .................................. 00 14723

(51) Int. Cl.
*C08F 114/18* (2006.01)

(52) U.S. Cl. ...................... 526/243; 526/245; 526/246; 526/248; 525/326.2; 428/422; 428/323; 428/532

(58) Field of Classification Search ................ 526/243, 526/245, 246, 248; 525/326.2; 428/422, 428/323, 532
See application file for complete search history.

(56) References Cited

U.S. PATENT DOCUMENTS

| | | | |
|---|---|---|---|
| 4,728,707 A | 3/1988 | Amimoto et al. | |
| 4,742,140 A | 5/1988 | Greenwood et al. | |
| 4,766,189 A | 8/1988 | Tsuetaki et al. | |
| 4,972,037 A * | 11/1990 | Garbe et al. ................ | 526/245 |
| 4,983,459 A | 1/1991 | Franz et al. | |
| 5,055,538 A | 10/1991 | Amimoto et al. | |
| 5,244,981 A | 9/1993 | Seidner et al. | |
| 5,276,175 A | 1/1994 | Dams et al. | |
| 5,292,796 A | 3/1994 | Dams et al. | |
| 5,308,705 A | 5/1994 | Franz et al. | |
| 5,321,108 A | 6/1994 | Kunzler et al. | |
| 5,439,998 A | 8/1995 | Lina et al. | |
| 5,587,424 A | 12/1996 | Langstein et al. | |
| 5,777,052 A | 7/1998 | Kobayashi et al. | |
| 5,798,429 A * | 8/1998 | Hager et al. .................. | 528/42 |
| 5,980,990 A | 11/1999 | Goodwin | |
| 5,990,212 A | 11/1999 | Hager et al. | |
| 6,111,043 A * | 8/2000 | Corpart et al. ............... | 526/243 |
| 6,132,861 A * | 10/2000 | Kang et al. .................. | 428/323 |
| 6,197,989 B1 | 3/2001 | Furukawa et al. | |

(Continued)

FOREIGN PATENT DOCUMENTS

EP        0609456 A       8/1994

(Continued)

*Primary Examiner*—David W. Wu
*Assistant Examiner*—Henry S. Hu

(57) ABSTRACT

The invention relates to fluorinated copolymers resulting from the polymerization of a polyfluorinated monomer, a (meth)acrylate amino alcohol, vinyl acetate and a silane monomer in a distillable organic solvent, aqueous compositions containing them, and their use for treating solid substrates, notably building materials.

10 Claims, 1 Drawing Sheet

U.S. PATENT DOCUMENTS

| | | | |
|---|---|---|---|
| 6,225,403 B1 | 5/2001 | Knowlton | |
| 6,271,293 B1 | 8/2001 | Karuga et al. | |
| 6,303,190 B1 | 10/2001 | Linert et al. | |
| 6,410,626 B1 | 6/2002 | Wada et al. | |
| 6,521,730 B1 * | 2/2003 | Pabon et al. | 526/245 |
| 6,649,272 B1 | 11/2003 | Moore et al. | |
| 2003/0083448 A1 | 5/2003 | Fan et al. | |

FOREIGN PATENT DOCUMENTS

| | | |
|---|---|---|
| EP | 542598 B1 | 2/1996 |
| EP | 0648890 B1 | 12/1996 |
| EP | 795592 A1 | 9/1997 |
| EP | 0816452 A2 | 1/1998 |
| EP | 0826650 B1 | 10/1999 |
| EP | 1225187 A1 | 7/2002 |
| FR | 2762000 A | 10/1998 |
| FR | 2816622 A * | 11/2000 |
| FR | 2805288 A1 | 8/2001 |
| FR | 2816622 A1 | 5/2002 |
| JP | 58104284 A | 6/1983 |
| JP | 58115175 A | 7/1983 |
| JP | 59168188 A | 9/1984 |
| JP | 60075678 A | 4/1985 |
| JP | 60081278 A | 5/1985 |
| JP | 61215683 A | 9/1986 |
| JP | 62038418 A | 2/1987 |
| JP | 63092687 A | 4/1988 |
| JP | 63159820 A | 7/1988 |
| JP | 01036674 A | 2/1989 |
| JP | 01036675 A | 2/1989 |
| JP | 01036676 A | 2/1989 |
| JP | 01036677 A | 2/1989 |
| JP | 02208382 A | 8/1990 |
| JP | 02252787 A | 10/1990 |
| JP | 02304093 A | 12/1990 |
| JP | 03009909 A | 1/1991 |
| JP | 03012410 A | 1/1991 |
| JP | 03012411 A | 1/1991 |
| JP | 03012412 A | 1/1991 |
| JP | 03190951 A | 8/1991 |
| JP | 03196118 A | 8/1991 |
| JP | 03286773 A | 12/1991 |
| JP | 04023819 A | 1/1992 |
| JP | 04270734 A | 9/1992 |
| JP | 04318010 A | 11/1992 |
| JP | 04328147 A | 11/1992 |
| JP | 05086193 A | 4/1993 |
| JP | 05098213 A | 4/1993 |
| JP | 06240239 A | 8/1994 |
| JP | 07090030 A | 4/1995 |
| JP | 07149935 A | 6/1995 |
| JP | 07228820 A | 8/1995 |
| JP | 08127514 A | 5/1996 |
| JP | 08127765 A | 5/1996 |
| JP | 08311403 A | 11/1996 |
| JP | 09012967 A | 1/1997 |
| JP | 09137117 A | 5/1997 |
| JP | 09194666 A | 7/1997 |
| JP | 09241622 A | 9/1997 |
| JP | 10212388 A | 8/1998 |
| JP | 11091259 A | 4/1999 |
| JP | 11217540 A | 8/1999 |
| JP | 11236532 A | 8/1999 |
| JP | 2000044802 A | 2/2000 |
| JP | 2000159964 A | 6/2000 |
| JP | 2001108949 A | 4/2001 |
| JP | 2002249657 A | 9/2002 |
| KR | 2001009606 A | 2/2001 |
| WO | WO 94/10227 A1 | 5/1994 |
| WO | WO 9700230 A1 | 1/1997 |
| WO | WO 97/39072 A1 | 10/1997 |
| WO | WO 2001018136 A1 | 3/2001 |
| WO | WO 2001019883 A1 | 3/2001 |
| WO | WO 02/40557 A1 * | 5/2002 |
| WO | WO 03018508 A1 | 3/2003 |

* cited by examiner

Figure 1
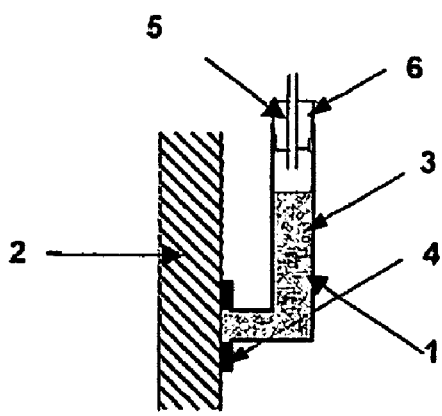
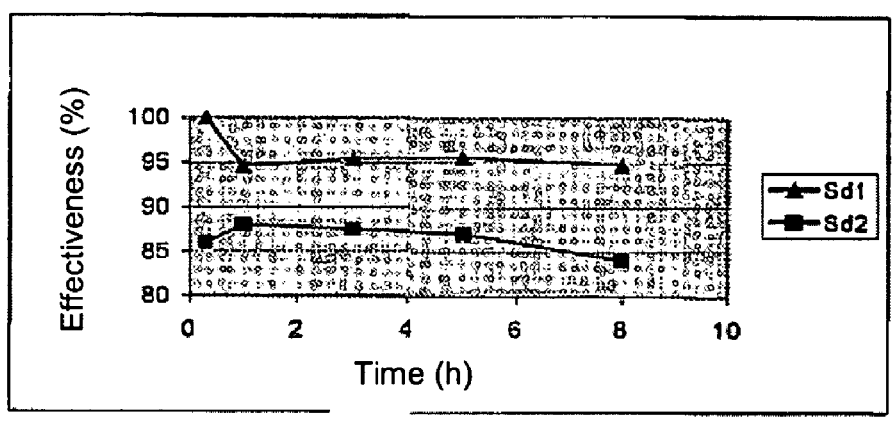
Figure 2
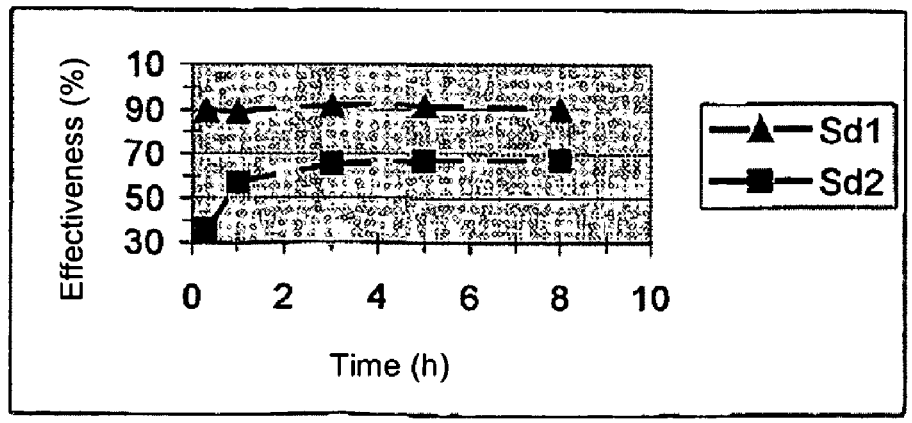
Figure 3

FLUORINATED COPOLYMERS FOR HYDROPHOBIC AND OLEOPHOBIC TREATMENT OF BUILDING MATERIALS

BACKGROUND

The present invention relates to new fluorinated cationic acrylic copolymers, to aqueous compositions comprising said copolymers, and to their use for coating and impregnation of various substrates such as textiles, leathers, wood, nonwovens, metals, concrete and, more particularly, for coating and impregnation of building materials to provide durable protection against water and soiling. It also relates to the solid substrates, notably the building materials so treated.

It has been known for a long time that fluorinated compounds, and in particular compositions based on fluorinated polymers, provide protection of various supports such as paper, leather or textiles against water, oil and grease.

It is also known that fluorinated polymers can effectively protect building materials against external attacks such as water and soiling.

Compositions disclosed in international patent application WO 97/39072 are thus useful for this latter application. These are, however, aqueous compositions of fluorinated cationic acrylic copolymers which still contain non-negligible quantities of organic solvent.

Patent application WO 00/05183 describes a composition which is also useful for protecting building materials against water and soiling, which comprises a copolymer such as those disclosed in WO 97/39072 cited above, as well as a penetrating assistant which is a surface active compound which facilitates penetration and wetting of a limestone and/or silicate substrate. On a practical scale, the presence of this assistant also requires the presence of an organic solvent which may be toxic and is thus little appreciated by the users.

Patent application WO 97/00230 describes a composition based on a fluorinated polymers comprising a silane monomer, useful for treating porous substrates such as building materials to protect against water and grease spots. This composition is aqueous and stable, and presents good abrasion resistance.

BRIEF DESCRIPTION OF THE DRAWINGS

FIG. 1 is a depiction of the device used in testing for the resistance to hydrostatic pressure.

FIG. 2 is a graph of resistance to hydrostatic pressure as percent effectiveness vs time in hours for Example 1 and Comparative Example 1.

FIG. 3 is a graph of resistance to hydrostatic pressure as percent effectiveness vs time in hours for Example 1 and Comparitive Example 1 after abrasion caused by scrubbing with a brush.

DESCRIPTION

The abrasion resistance characterizes the durability of surface treatments for building materials. This mechanical property can be evaluated using a scrubbing test which simulates aggressive cleaning of the coating In the presence of a detergent. This test is described in patent application WO 97/00230. The copolymers Included in the composition of WO 97/00230 are of the anionic type. They have good penetration into substrates such as limestone rock or concrete, and it is necessary to apply a high concentration to obtain an effective hydrophobic and oleophobic coating on the surface of the substrate. They thus have the drawback of being uneconomic.

It has now been found that the introduction of a specific silane monomer in a fluorinated cationic acrylic polymer makes it possible to obtain an effective hydrophobic and oleophobic treatment on building materials at low concentration with good abrasion resistance. This polymer is further applicable in the form of an aqueous dispersion which is stable to storage and free of organic solvent.

The fluorinated cationic acrylic copolymers of the present invention are obtained by polymerizing a mixture of monomers, comprising by weight:

(a) from 50 to 92%, preferably from 70 to 90% of one or more polyfluorinated monomers of general formula:

$$Rf\text{-}B\text{—}O\text{—}C(O)\text{—}C(R)\text{=}CH\text{—}R \qquad (I)$$

in which:

Rf represents a linear or branched chain perfluorinated radical containing 2 to 20 carbon atoms, preferably 4 to 16 carbon atoms, B represents a bivalent group bonded to O via a carbon atom which may comprise one or more atoms of oxygen, sulfur and/or nitrogen, one of the symbols R represents a hydrogen atom and the other a hydrogen atom or an alkyl radical containing 1 to 4 carbon atoms;

(b) from 1 to 25%, preferably 8 to 18% of one or more monomers of general formula:

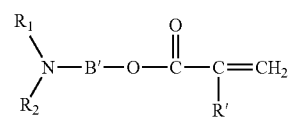

(II)

in which:

B' represents a linear or branched alkylene radical containing 1 to 4 carbon atoms, R' represents a hydrogen atom or an alkyl radical containing 1 to 4 carbon atoms, the symbols $R_1$ and $R_2$, identical or different, each represent a hydrogen atom, a linear or branched alkyl radical containing 1 to 18 carbon atoms or a hydroxyethyl or benzyl radical, or $R_1$ and $R_2$, together and with the nitrogen atom to which they are attached, form a morpholino, piperidino or 1-pyrrolidinyl radical;

(c) from 0 to 25%, preferably 2 to 10% of a vinyl derivative of general formula:

$$R''\text{—}CH\text{=}CH_2 \qquad (III)$$

in which R'' can be an alkylcarboxylate or alkylether group containing 1 to 18 carbon atoms, preferably 1 to 4 carbon atoms;

(d) from 0.5 to 20%, preferably 1 to 10%, of a monomer of general formula:

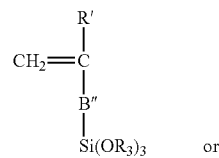

(IVA)

or

-continued

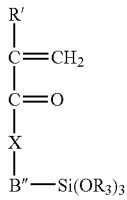
(IVB)

in which:

R' is as defined previously,

B" represents B' as defined previously or a single bond,

X represents an oxygen, nitrogen or sulfur atom, $R_3$ represents a linear or branched alkyl radical comprising 1 to 10, preferably 1 to 5 carbon atoms; and (e) from 0 to 10%, preferably 0 to 8% of any monomer other than the monomers of formulae (I), (II), (III) and (IV).

The fluorinated copolymers of the present invention are prepared by copolymerization of monomers dissolved in a distillable organic solvent. The term distillable organic solvent means any organic solvent or mixture of organic solvents whose boiling temperature at atmospheric pressure is less than 150° C. The reaction medium is then diluted with water in the presence of an inorganic or organic acid in order to form a salt with the macromolecules.

According to a preferred embodiment of the invention, this dilution step is carried out in the presence of hydrogen peroxide, or is followed by a treatment using an aqueous solution of hydrogen peroxide.

Although these fluorinated cationic acrylic copolymers are particularly adapted for treating building materials, they can also be used for hydrophobic and oleophobic treatment of other substrates such as papers, textiles, nonwovens, leather and carpets.

According to the present invention, it is preferred to use:

(a) As polyfluorinated monomers of formula I, compounds of general formula:

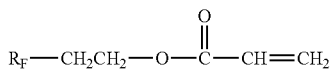

in which $R_F$ is a perfluoroalkyl radical containing 4 to 16 carbon atoms;

(b) as the monomer of formula II, dimethylaminoethyl methacrylate of formula:

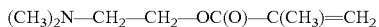

(c) as the monomer of formula III, vinyl acetate; and (d) as the monomer of formula IV, vinyl triisopropoxysilane of formula:

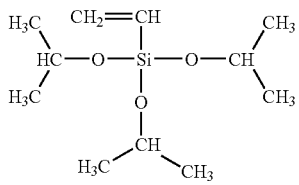

or propyltriisopropoxysilane methacrylate of formula:

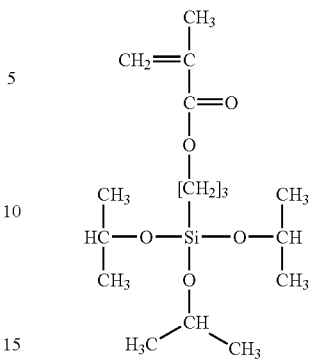

As distillable organic solvents which can be used for the polymerization, it is possible to mention as non-limiting examples ketones (for example acetone, methyl ethyl ketone), alcohols (for example isopropanol), ethers (for example methyl ethyl ether).

In order to carry out the invention, it is preferred to use as the solvent methyl isobutyl ketone (MIBK) or methyl ethyl ketone (MEK) or a mixture of these with acetone.

The total monomer concentration in the organic solvent or mixture of organic solvents can be from 20 to 70% by weight and is preferably comprised between 40 and 60%.

The copolymerization is effected in the presence of at least one initiator, used in a proportion of 0.1 to 1.5% relative to the total weight of monomers. As initiators, it is possible to use peroxides such as, for example, benzoyl peroxide, lauryl peroxide, succinyl peroxide and tertiobutyl perpivalate, or azoic compounds such as 2,2'-azo-bis-isobutyronitrile, 4,4'-azo-bis-(4-cyano-pentanoic). The copolymerization step can be effected at a temperature from 40° C. to the boiling point of the reaction mixture. It is preferred to operate between 60 and 90° C.

The dilution step consists in adding, to the organic copolymer solution, an aqueous solution of strong or medium strong inorganic or organic acids, i.e. acids whose dissociation constant or whose first dissociation constant is greater than $10^{-5}$.

Examples of such acids are hydrochloric, hydrobromic, sulfuric, nitric, phosphoric, acetic, formic, propionic or lactic acids. Preferably, acetic acid is used. The quantity of aqueous solution used and the acid concentration must be sufficient firstly to completely react to form salts with all the amine functions introduced by the monomer(s) of formula (II) and, secondly, to obtain a copolymer solution having a final dry material content comprised between 5 and 40%, preferably between 20 and 30%. For complete salt formation with the amine functions, the quantity of acid is advantageously comprised between 0 and 5 acid equivalents relative to the monomer(s) of formula (II), preferably between 1 and 2 equivalents.

The quantity of hydrogen peroxide used is comprised between 0 and 10%, preferably 0.5 to 4% relative to the total weight of initial monomers. The treatment is effected between 25 and 100° C., preferably 70 to 85° C.

The present invention also has as its objective aqueous compositions comprising a fluorinated copolymer such as previously defined. Said compositions are obtained by completing the fluorinated copolymer fabrication process such as previously defined with a distillation step, in order to eliminate all traces of the organic solvent used in the synthesis. The aqueous compositions of the invention do not have a flash point between 0 and 100° C., measured by ASTM D3828. The distillation can be effected at atmospheric or reduced pressure. These aqueous compositions are generally in the form of dispersions which are stable over time. Thus, these dispersions remain homogeneous, and they can be shipped and stored while remaining suitable for use in hydrophobic and oleophobic treatments of substrates. Advantageously, they can also be diluted with water.

The concentration of the fluorinated copolymer of the invention in water is generally comprised between 1 and 50%, preferably between 20 and 30%.

The present invention also has as its objective a solid substrate comprising, and preferably coated with at least one fluorinated copolymer of the invention such as previously defined.

As substrates which can be rendered oleophobic and hydrophobic with the products of the invention, it is possible to use very diverse materials such as, for example, papers, cardboard and similar materials, woven or nonwoven articles based on cellulose or regenerated cellulose, on natural, artificial or synthetic fibers such as cotton, cellulose acetate, wool, silk, fibers made from polyamide, polyester, polyolefin, polyurethane or polyacrylonitrile, leather, plastic materials, glass, wood, metals, porcelain, painted surfaces.

It is however preferred to use building materials such as brick, tile, ceramic or baked clay tiles, natural or reconstituted rock, plaster, concrete, cement or mortar, wood, glass, metals and plastic materials.

Concrete, stone, brick and tile are particularly preferred materials.

According to a preferred embodiment of the invention, the solid substrate is a building material, the quantity of fluorinated copolymer applied is generally comprised between 0.1 and 10 g/m$^2$, preferably 1 and 5 g/m$^2$ relative to the area of said substrate.

The compositions can be applied in one or more layers using known techniques, for example coating, impregnation, immersion, spraying, brushing, etc.

The compositions of the invention can also be mixed with other compositions, notably compositions comprising a fluorinated cationic acrylic copolymer without silane monomer. They can also be mixed with polyvinylalcohols as described in patent EP-A-0 714 870

The coating obtained is generally dried at ambient temperature. It can also be dried at elevated temperature, for example in an oven. It can also be applied to a hot support.

The following tests were used to evaluate the performance of substrates used according to the invention:

Oil-repellency Test

The oil-repellency was measured using the method described in "AATCC Technical Manual—Test Method 118-1992", which evaluates the non-wettability of the substrate with a series of oils numbered from 1 to 8:
N° 1 Vaseline oil
N° 2 Vaseline oil/n-hexadecane (65/35)
N° 3 n-hexadecane
N° 4 n-tetradecane
N° 5 n-dodecane
N° 6 n-decane
N° 7 n-octane
N° 8 n-heptane The test consists in depositing drops of these oils on the treated substrate and observing the effect of the drop after 30 seconds of contact.

A rating is obtained by giving the value of the number of the last drop of liquid which has neither penetrated nor wet the substrate.

Water-repellency Test

The method is adapted from the oil-repellency test. Test liquids numbered from 1 to 10 are mixtures by weight of demineralized water and 2-propanol.

| Test liquid reference n° | Composition by weight | |
|---|---|---|
| | Demineralized water | 2-propanol |
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10 | 0 | 100 |

The test consists in depositing drops of these liquids on the treated substrate and observing the effect of the drop after 30 seconds of contact.

A rating is obtained by giving the value of the number of the last drop of liquid which has not penetrated nor wet the substrate.

Test f r for Resistance to Hydrostatic Pressure

The test consist in measuring the water resistance of vertical substrate made from baked clay treated according to the invention, when water is applied to the surface of said substrate at a certain hydrostatic pressure. The test is intended to evaluate the resistance of a building facade treated according to the invention to wind driven rain.

The device shown in FIG. 1 is used which comprises a glass tube (1) attached to the surface if a vertical substrate (2), said pipe being filled with water (3) to exercise a hydrostatic pressure on the surface of the substrate (2).

The water column has a height of 95 mm. This gives a hydrostatic pressure of 950 Pa (95 kg/cm$^2$) on the surface of the substrate.

The glass tube is attached to the substrate using a silicon based elastomeric adhesive (4). The stopper (6) attached to the capillary (5) avoids water evaporation.

It was verified when developing the test that the drop in water level in the glass tube corresponds only to the absorption of water by the substrate and that it is not influenced by water evaporation or by water absorption by adhesive (4). This was done by fixing the device onto a glass plate as the substrate. No drop in water level was observed after seven days.

The test consists in measuring the quantity of water contained in the glass tube which is absorbed by the substrate as a function of time. This quantity is measured for the treated and untreated substrate.

The effectiveness of the treatment (expressed in %) is given by the formula:

Effectiveness (%)=100×(1−$Q_1/Q_0$)

in which:

$Q_0$ represents the quantity of water absorbed by the untreated substrate;

$Q_1$ represents the quantity of water absorbed by the treated substrate.

Scrubbing Test

This test consists in determining the resistance to scrubbing of the hydrophobic and oleophobic properties of a substrate treated with an aqueous composition of the invention, as determined by the three tests previously described, under standardized scrubbing conditions.

It uses a scrubbing operation on the substrate carried out under the following conditions:
- depositing 2 ml of an aqueous solution containing 6% by weight of detergent (Typol)
- fifty passages of a NYLON brush on the substrate having an area of 2.5×7 cm$^2$ and applied at a force of 10 N perpendicular to the support, corresponding to a total duration of 45 seconds;
- rinsing the substrate surface for 1 minute with city water;
- eliminating the city water with demineralized water.

The following examples illustrate the invention without limiting it. The parts indicated are by weight unless otherwise noted.

EXAMPLE 1

The following are introduced into a reactor having a capacity of 600 parts by volume, and equipped with a stirrer, a thermometer, a reflux condenser, a drop funnel, a nitrogen inlet and a heating device:
- 40 parts MIBK, 26 parts acetone,
- 14.7 parts dimethylaminoethyl methacrylate (monomer of formula II),
- 7.8 parts vinyl acetate (monomer of formula III),
- 3.9 parts of vinyl triisopropoxysilane (monomer of formula IV),
- 76 parts of a mixture fluorinated acrylates (monomer of formula I), of formula:

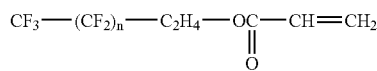

where n is equal to 5, 7, 9, 11 and 13 in weight ratios respectively of 1/63/25/9/3; and finally
- 0.38 parts 4,4'-azobis(4-cyano-pentanoic) acid.

The mixture is heated to 70° C. under a nitrogen atmosphere for 4 hours, then 0.32 parts of 4,4'-azobis(4-cyano-pentanoic) acid are introduced and the reactor is maintained at 70° C. for 4 hours.

Then an aqueous solution comprising 290 parts water, 7.6 parts acetic acid and 2.4 parts of 35% by weight hydrogen peroxide is introduced at 70° C. over three hours.

The mixture is maintained at 70° C. for 2 hours under a nitrogen sweep, then the solution is distilled under reduced pressure to obtain a 25% solution of the fluorinated copolymer of the invention.

The solution is cooled to ambient temperature. 390 parts of an amber colored dispersion (S1) of the fluorinated cationic acrylic copolymer are obtained, the dispersion being perfectly stable over time and having theoretical composition by weight of 74/14/8/4 of the monomers of formulae I/II/III/IV respectively.

This dispersion does not contain any organic solvent and does not have a flash point between 0 and 100° C. as measured by ASTM D3828.

COMPARATIVE EXAMPLE 1

The procedure of example 1 is repeated except that the vinyl triisopropoxysilane is completely eliminated and replaced with methacrylic acid and vinyl acetate. 15.2 parts of dimethylaminoethyl methacrylate, 1.2 parts methacrylic acid, 8.4 parts of vinyl acetate and 77.6 parts of the fluorinated acrylate mixture are thus introduced.

390 parts of an amber colored dispersion (Sc1) of a fluorinated cationic acrylic copolymer without silane monomer are obtained, the dispersion being perfectly stable over time. This solution does not have a flash point between 0 and 100° C. as measured by ASTM D3828.

EXAMPLE 2

Solutions (S1) and (Sc1) are used. The dilute solutions Sd1 and Sd2 described below are prepared from them.

| Composition (g/l) | Sd1 | Sd2 |
|---|---|---|
| S1 | 80 | 0 |
| S2 | 0 | 80 |
| Water | 920 | 920 |
| Total | 1000 | 1000 |

The dilute solutions are applied crosswise using a brush (width 405 cm) on baked clay tiles (for example obtained from Brunateau S. A. F-40990 St Paul les Dax). The quantity of deposit is 100±10 g/m$^2$ of dilute composition, corresponding to about 2 g/m$^2$ of copolymer. The treated tiles are dried for three days in air at ambient temperature.

The tiles are then subjected to the oil repellency test, water repellency test and hydrostatic resistance before and after brushing test. The results are reported in the following table.

Before Brushing

| Treatment test | oil repellency test | water repellency |
|---|---|---|
| Sd1 | 8 | 10 |
| Sd2 | 8 | 10 |

The results of resistance to hydrostatic pressure are given in FIG. 2, which shows the effectiveness (%) as the ordinate and the contact time with water (in hours) as the abscissa, depending whether the treatment applied is Sd1 or Sd2.

It is clear that the fluorinated copolymer of example 1 gives the substrate a very good effectiveness in the hydrostatic resistance: this is in the range 95 to 100% depending on the contact time with water. In contrast, the polymer from comparative example 1 gives an effectiveness which does not exceed 88%.

After Brushing

| Treatment test | oil repellency test | water repellency |
|---|---|---|
| Sd1 | 5 | 4 |
| Sd2 | 3 | 3 |

The hydrostatic resistance results are indicated in FIG. 3.

It appears that the fluorinated polymer of example 1 has better retention of oleophobic properties after brushing (rating decrease from 8 to 5) compared with that from comparative example 1 (rating drop from 8 to 3).

It is also clear that the fluorinated polymer of example 1 retains a good hydrostatic resistance after abrasion (decrease in effectiveness of only 5%) whereas the polymer from comparative example 1 drops by 15% after abrasion.

EXAMPLE 3

A fluorinated cationic acrylic copolymer is prepared by repeating example 1 except that the vinyl triisopropoxysilane (monomer of formula IVA) is replaced by propyl-triisopropoxysilane methacrylate (monomer of formula IVB).

The application tests lead to results which are identical to those obtained with the fluorinated copolymer of example 1.

What is claimed is:

1. Fluorinated cationic acrylic copolymers obtained by polymerizing a mixture of monomers comprising, by weight:
  (a) from 50 to 92% of one or more polyfluorinated monomers of general formula:

$$Rf\text{—}B\text{—}O\text{—}C(O)\text{—}C(R)\text{=}CH\text{—}R \tag{I}$$

in which:
  Rf represents a linear or branched chain perfluorinated radical containing 2 to 20 carbon atoms, preferably 4 to 16 carbon atoms,
  B represents a bivalent group bonded to O via a carbon atom which may comprise one or more atoms of oxygen, sulphur and/or nitrogen,
  one of the symbols R represents a hydrogen atom and the other a hydrogen atom or an alkyl radical containing 1 to 4 carbon atoms;
  (b) from 1 to 25% of one or more monomers of general formula:

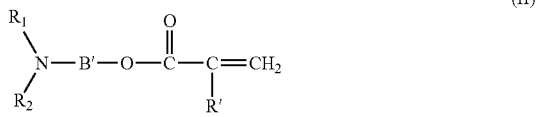
  (II)

in which
  B' represents a linear or branched alkylene radical containing 1 to 4 carbon atoms,
  R' represents a hydrogen atom or an alkyl radical containing 1 to 4 carbon atoms,
  the symbols $R_1$ and $R_2$, identical or different, each represent a hydrogen atom, a linear or branched alkyl radical containing from 1 to 18 carbon atoms or a hydroxyethyl or benzyl radical, or $R_1$ and $R_2$ together with the nitrogen atom to which they are attached form a morpholino, piperidino or 1-pyrrolidino radical;
  (c) from 0 to 25% of a vinyl derivative of general formula:

$$R''\text{—}CH\text{=}CH_2 \tag{III}$$

in which R'' can be an alkylcarboxylate or alkylether group containing 1 to 18 carbon atoms, preferably from 1 to 4 carbon atoms;
  (d) from 0.5 to 20% of a monomer of general formula:

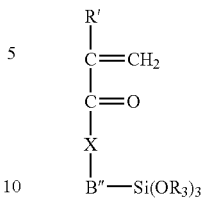
  (IVA)

-continued

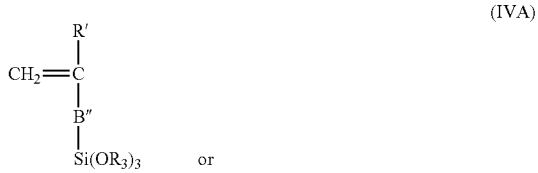
  (IVB)

in which:
  R' is as defined previously,
  B'' represents B' as defined previously or a single bond,
  X represents an oxygen, nitrogen or sulfur atom,
  $R_3$ represents a linear or branched alkyl radical comprising 1 to 10 carbon atoms; and
  (e) from 0 to 10% of any monomer other than the monomers of formulae (I), (II), (III) and (IV);
  said polymerization comprising:
  dissolving the monomers in a distillable organic solvent; then
  diluting the reaction mixture with water in the presence of an inorganic or organic acid in order to form a salt with the macromolecules.

2. Fluorinated cationic acrylic copolymers according to claim 1, characterized in that the dilution with water is carried out in the presence of hydrogen peroxide, or is followed by a treatment using an aqueous solution of hydrogen peroxide.

3. Fluorinated cationic acrylic copolymers according to claim 1 or 2, characterized in that the following are used:
  (a) as polyfluorinated monomers of formula I, compounds of general formula:

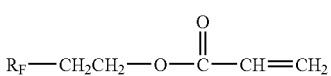

in which $R_F$ is a perfluoroalkyl radical containing 4 to 16 carbon atoms;
  (b) as the monomer of formula II, dimethylaminoethyl methacrylate of formula:

$$(CH_3)_2N\text{—}CH_2\text{—}CH_2\text{—}OC(O)\text{—}C(CH_3)\text{=}CH_2;$$

(c) as the monomer of formula III, vinyl acetate; and
  (d) as the monomer of formula IV, vinyltriisopropoxysilane of formula IVA or propyltriisopropoxysilane methacrylate of formula IVB.

4. Fluorinated cationic acrylic copolymers according to claim 1 or 2, characterized in that the organic solvent used is methyl isobutyl ketone (MIBK) or methyl ethyl ketone (MEK) or a mixture of these with acetone is used as organic solvent.

5. Fluorinated cationic acrylic copolymers according claim 2, characterized in that quantity of hydrogen peroxide used is comprised between 0.5 to 4% relative to the total weight of initial monomers.

6. Aqueous compositions comprising between 1 to 50%, of a fluorinated cationic acrylic copolymer as defined in claim 1 or 2.

7. Solid substrate comprising at least one fluorinated cationic acrylic copolymer such as defined in claim 1 or 2.

8. Solid substrate according to claim 7, characterized in that it is a building material.

9. Solid substrate according to claim 8, characterized in that the building material is chosen among concrete, stone, brick and tiles.

10. Building material according to claim 8, characterized in that the quantity of copolymer applied is between 0.1 and 10 g/m², preferably between 1 and 5 g/m².

* * * * *